United States Patent [19]
Tarves, Jr.

[11] 3,740,820
[45] June 26, 1973

[54] METHOD OF REPAIRING DAMAGED HOLES IN A BOILER DRUM

[76] Inventor: Robert J. Tarves, Jr., P.O. Box 282, 260 Erial Road, Blackwood, N.J. 08012

[22] Filed: Jan. 28, 1971

[21] Appl. No.: 110,404

[52] U.S. Cl. .................. 29/401, 29/157.4, 29/527.1
[51] Int. Cl. ............................................. B22d 19/10
[58] Field of Search ................ 29/157.4, 401, 527.1; 220/63

[56] References Cited
UNITED STATES PATENTS

| | | |
|---|---|---|
| 3,557,435 | 1/1971 | Powell et al. ........................ 29/401 |
| 1,857,912 | 5/1932 | Jones ............................... 29/401 X |
| 2,120,525 | 6/1938 | McKerihan ........................ 29/401 |
| 3,608,173 | 9/1971 | Watson et al. ..................... 29/157.4 |

Primary Examiner—Charles W. Lanham
Assistant Examiner—D. C. Reiley, III
Attorney—Edward M. Farrell

[57] ABSTRACT

Apparatus and methods for repairing or producing openings in a boiler drum is provided. Weld material is applied to the drum in the area of the openings to reduce substantially the size of the openings. A precisely aligned drill within the drum is then radially and longitudinally moved in steps is inserted within the drum and to produce or redimension openings within the drum.

7 Claims, 13 Drawing Figures

INVENTOR.
ROBERT J. TARVES, JR.
BY Edward M. Farrell
ATTORNEY

INVENTOR.
ROBERT J. TARVES, JR
BY
ATTORNEY

INVENTOR.
ROBERT J. TARVES, JR.
BY
Edward M. Farrell
ATTORNEY

METHOD OF REPAIRING DAMAGED HOLES IN A BOILER DRUM

In the normal production of power, heat energy contained in a fuel is constantly supplied at one end and mechanical or electrical power is delivered at the other end of the system. The principal machine of a power plant which converts heat energy into mechanical energy is known as the prime mover, which could be a turbine or a reciprocating engine or both. In many systems steam is generated in a boiler by burning fuel in a furnace. The steam formed by the vaporization of water in the boiler serves as a heat carrier, which is readily conveyed through pipe lines to the prime movers. In heat power plants, energy is secured by rapid oxidation of some material which may be either in its natural state, such as coal, or different types of fuel.

A steam generating unit includes apparatus for producing, furnishing or recovering heat, together with apparatus for transferring the heat. The unit may include a boiler furnace, fuel burning equipment and numerous other items.

Steam generating drums used in most power systems are designed to be used with water levels affording a large steam liberating surface. A large number of tubes are connected to openings in the drums to afford means to enable the gases to expand and contract and to be applied to other units in the steam generating system.

Repair and replacement of boilers and their associated tubes are often required as a result of various faults developed in the system or impurities in the water used. For example, feedwater impurities precipitated during operation of a typical steam generating system may result in the formation of scale, corrosion, embrittlement and other ill effects in the boiler drum or associated tubing.

Despite a program of maintenance, scale deposited on the internal surfaces of the drum and tubes left by the evaporation of water carrying impurities often cause overheating and weakening of the boiler tubes. Also, corrosion and scale cause overheating as a result of lack of heat transfer causing the tubes to burn out. Also, the corrosion produces a wasting away of boiler parts with a corresponding reduction in their strength. This is often accompanied by an enlargement or elongation of the holes in the boiler.

In the past, overheating causing elongation of the holes in a boiler have been repaired by the insertion of copper ferrules to fill in the voids created by the elongations. This involves removal of the tubes, inserting the ferrules, replacing and expanding the ends of the tubes. However, the use of ferrules has limitations beyond which they are not permitted or acceptable by regulatory or inspection agencies. The reason for this is that ferrules are subject to be blown out as a result of the high pressures created within the boiler drum.

When the holes in the boiler drum become enlarged or elongated as a result of corrosion, overheating or other reasons, the steam generating system operates at reduced pressures and efficiency as a result of the leakage around the openings which receive the tubes. This often necessitates the condemnation of the boiler drum for steam generating purposes. The replacement of such boiler drums involves a heavy outlay of expense for equipment and labor.

It is an object of this invention to provide novel means and methods for repairing a drum of the type used in steam generating plants.

It is a further object of this invention to provide improved means and methods for repairing with a minimum amount of expense a drum of the type used in steam generating plants.

It is still a further object of this invention to provide improved means and methods for redrilling a plurality of holes in a drum with high precision and efficiency.

It is still a further object of this invention to provide improved apparatus for producing openings within a drum.

In accordance with the present invention, apparatus and methods for repairing a boiler drum is provided. A weld material is added to enlarged corroded openings to provide openings smaller in dimensions than the desired sizes. A boring machine is mounted on to a shaft within the drum and disposed for rotational and longitudinal movements within the drum. A drill on the boring machine is larger than the smaller openings produced by the excess weld material and dimensioned to the size of the desired openings. The boring tool is first rotated to drill a set of openings in a row about the circumference of the drum. The tool is then moved in steps longitudinally along the drum. At each step, the tool is moved about the circumference of the drum to drill another set of holes. The sequence is repeated until all the holes in the drum have been redrilled. In some cases, holes are rebored in a drum larger than the desired sizes with metal rings with the desired inside diameters being inserted into the enlarged openings.

Other objects and advantages of the present invention will be apparent and suggest themselves to those skilled in the art, from a reading of the following specification and claims, in conjunction with the accompanying drawings in which:

In describing one embodiment of the subject invention it is assumed that a boiler drum has been in use and that the openings therein have become elongated or enlarged as a result of corrosion, overheating or the like. Instead of replacing the boiler drum with a new drum, the subject invention provides the methods and means for repairing the defective drum. The first step, not illustrated, involves removing the tubes from the openings in the drum. In most cases, new tubes will replace the removed tubes. It will also be assumed in describing the present invention that various reference points are available which are indicative of the center of the drum and positions of the holes to be drilled. These may include lines marked on the drum after various measurements.

Figure 7A:
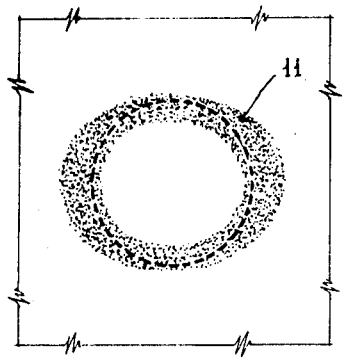
FIGS. 7a, 7b and 7c illustrate steps in the repair of a hole in a drum involving the addition of weld material.
Figure 7B:
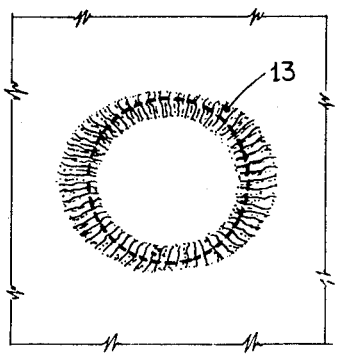
Figure 7C:
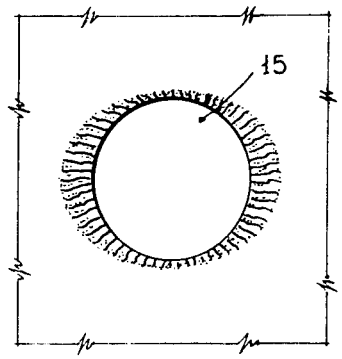

Referring to the drawings, a typical boiler drum 10 includes apparatus 12 disposed therein. The drum 10 includes a plurality of openings 14 for receiving a plurality of tubes (not illustrated). FIG. 7a illustrates a typical elongated hole 11 in a drum which must be repaired. FIG. 7b illustrates an elongated hole with excess weld material 13 added therein. FIG. 7c illustrates a hole 15 with the excess weld material after it has been rebored to the desired size.

Weld material is added around the openings in the drum after suitable cleaning which involves removing the corroded material from the drum. As a result of adding excess weld material, smaller holes are formed in the drum. The weld material may be added by conventional methods. The smaller holes are smaller in area than required to receive the new tubes which eventually must be replaced on the drum.

After the welding operation, the apparatus 12 is inserted into the drum 10 through an opening at the end of the drum (not illustrated). The apparatus 12 may be inserted through the opening in pieces and then assembled within the drum. The diameter of the drum 10 is large enough to permit an operator to enter to perform the repairs on the drum, as will be described. It may be in the order of three feet in diameter or larger. One of the features of the present invention relates to the machining of holes within the drum.

The apparatus 12 includes a machine tool 16 adapted to be electrically driven. The tool includes a drill element 18 dimensioned to the desired size of the holes to be drilled in the drum.

Figure 4:
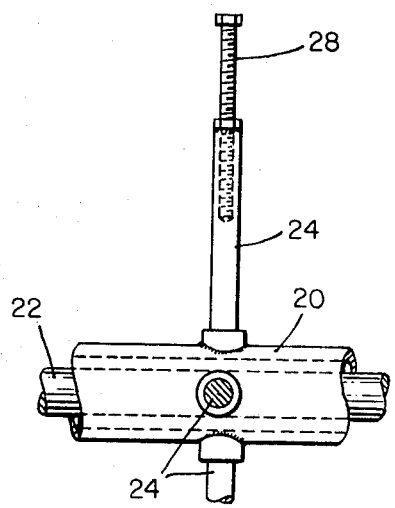
FIG. 4 illustrates an enlarged portion of the assembly shown in FIG. 1.
Figure 5:
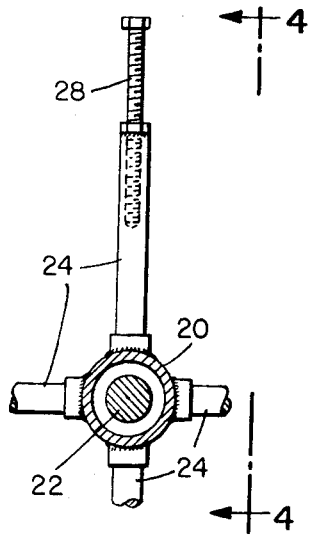
FIG. 5 is a view taken along lines 4—4 of FIG. 4.

The machine tool 16 is supported by supporting means including a main cylindrical tube 20 having a slidable shaft 22 extending therethrough. Details of this arrangement are illustrated in FIGS. 4 and 5. The tube 20 is held fixedly in place within the drum 10 by means of a plurality of legs 24 and 26. The legs 24 and 26, which are spaced from each other, are secured at one end to the tube 20 by any suitable means and extend toward the inner wall of the drum 10.

The legs 24 and 26 include a plurality of alignment screws 28 and 30, respectively, in threaded engagement with the free ends of the legs. The alignment screws may be adjusted to assure that the tube 20 is centered within the drum 16 prior to performing a drilling operation. The screws 28 and 30 are maintained tightly against the inner wall of the drum during a drilling operation.

A pair of bearing members 32 and 34 are suitably mounted to the ends of the tube 20 and dimensioned to receive the shaft 22 therein. The shaft 22 is adapted to be rotated or moved longitudinally within the tube 20.

Figure 3:
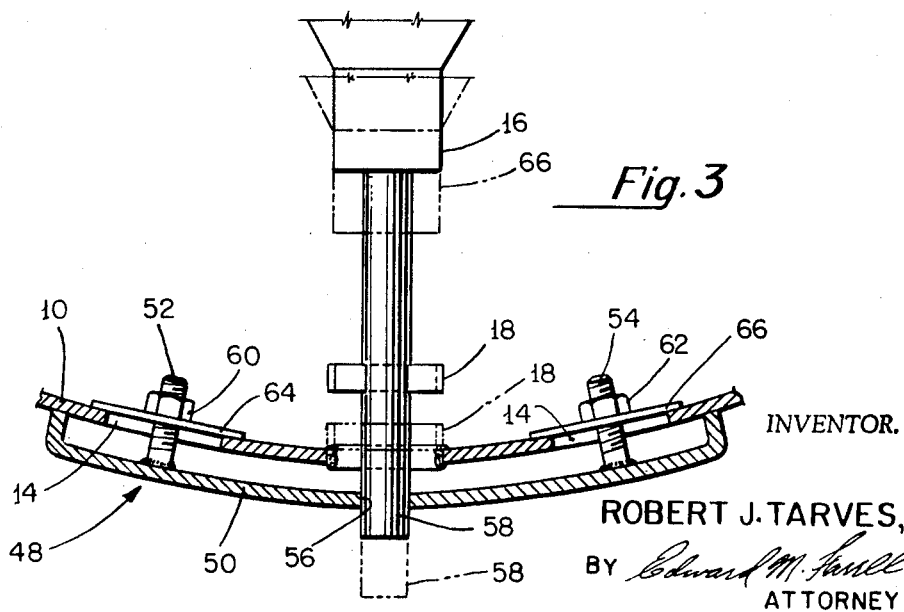
FIG. 3 is an enlarged view of a portion of the apparatus illustrated in FIG. 2 including the alignment means.

The shaft 22 is secured to a frame 36 for holding the machine tool 16. A toothed rack 38 is operatively connected to a gear mechanism in a housing 40. A handle 42 is provided to permit an operator to move the tool 16 radially towards the inner wall of the drum 10 by the engagement of the gear mechanism within the housing 40 with the rack 38. The radial movement of the tool 16 is illustrated in FIG. 3.

The tool 16 is adapted to be rotated (illustrated in FIG. 2) or moved longitudinally (illustrated in FIG. 6) within the drum 10 in accordance with the movement of the shaft 22. These movements permit the tool 16 to be properly aligned with a hole to be rebored or drilled. After the tool 16 has been aligned and prior to reboring or drilling, a tightening mechanism 44 including a screw threadedly engaging the top portion 46 of the frame 36 is manually adjusted to engage the inner wall of the drum to maintain the boring tool 16 firmly in position as the drilling operation is being performed.

During operation, an operator, after securing the tool 16 in place, moves the cutting portion of the tool in a radial direction by manually turning the handle 42 so that the drill 18 inserted into one of the holes 14 to rebore the hole or, in the case of manufacturing, drill a new hole. After boring or drilling one hole, the tightening means 44 is loosened to permit the tool 16 to be rotated until it is positioned to bore or drill the next hole. The boring or drilling operations are continued until all the holes in one row about the circumference of the drum 10 have been bored or drilled.

Following the boring or drilling of one row of holes about the circumference of the drum, an operator then moves the tool 16 longitudinally along the axis of the drum to the next row of holes to be drilled or bored. These steps are repeated until all the holes in the drum have been bored or drilled. The length of the shaft 22 will limit the number of rows of holes which can be drilled or bored accurately before the entire apparatus 12 has to be moved because of the tendency of the shaft to flex if it is too long. However, in some cases, the shaft could extend along the entire length of the drum to eliminate the need to periodically move the apparatus during a repair operation.

In many cases, the holes to be drilled in the drum are relatively large, in the order of 3 or more inches. This generally requires that stabilizing means be used with the machine tool during the machining operation.

Figure 1:
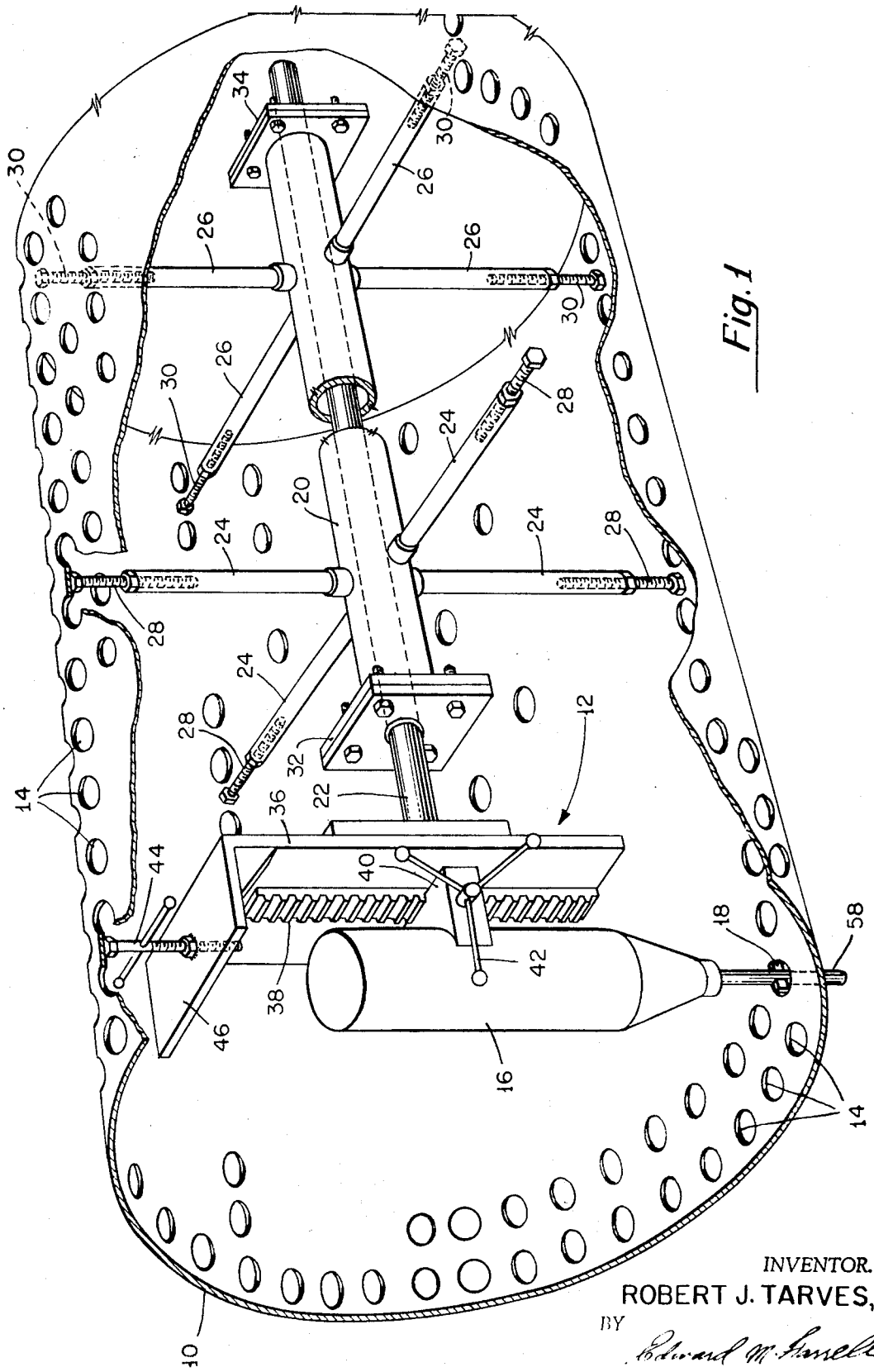
FIG. 1 is a perspective view, partly broken away and in cross-section, of a portion of a boiler drum and apparatus of the present invention.
Figure 2:
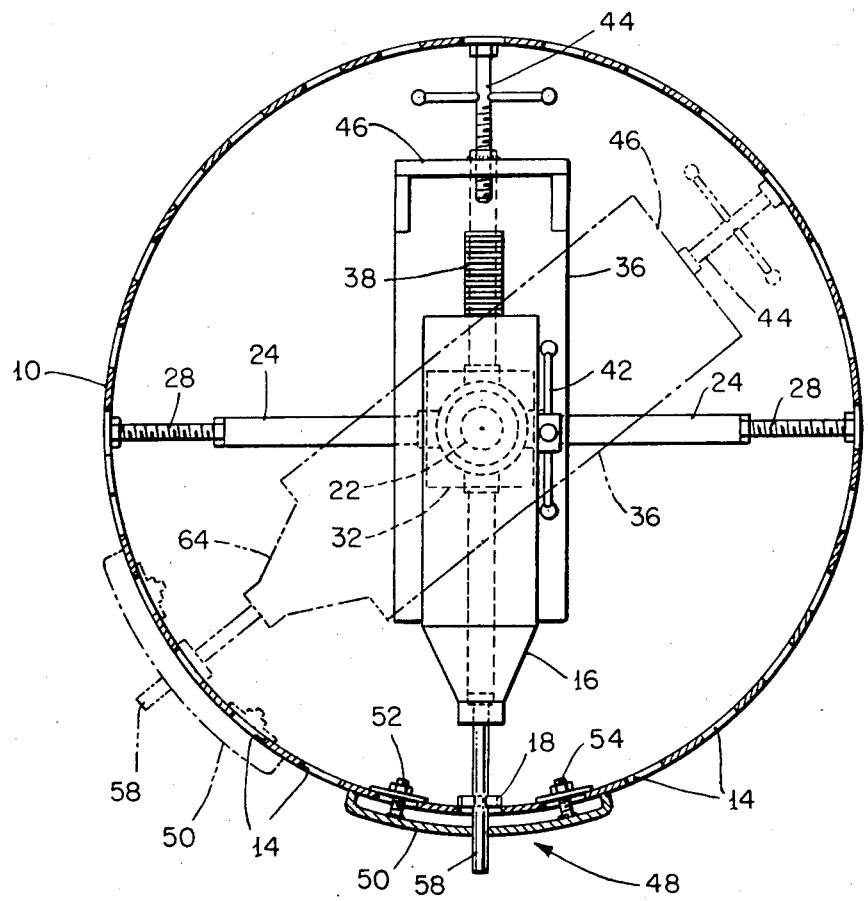
FIG. 2 is an end view of the arrangement of FIG. 1, including tool alignment means, in accordance with the present invention.

In order to assure precise alignment and stability of the tool during a machining operation as it is being moved through a hole, an alignment assembly, illustrated in FIGS. 2 and 3, is employed. The assembly includes a main plate member 50. A pair of threaded elements 52 and 54 are welded or otherwise suitably secured to the plate member 50. The threaded elements 52 and 54 are spaced so that they may be inserted through holes in the drum which are disposed on either side of the hole to be drilled.

The member 50 also includes a central aperture 56 disposed to be aligned with the hole to be drilled. The aperture 56 is dimensioned to receive an alignment portion of the tool 16 disposed in front of the element 18.

The member 50 is held in place on the drum by means of bolts 60 and 62 threadedly engaging the threaded elements 52 and 54, respectively. A pair of washer type elements 64 and 66 larger in area than the holes in the drum is provided to hold the member 50 when the bolts 60 and 62 are tightened.

When a hole is to be drilled in the drum, the member 50 is secured to the outer surface of the drum. The tool portion 58 is inserted into the opening 56. This arrangement assures that the drill 18 is maintained in precise alignment as it performs the drilling operation.

Figure 6:
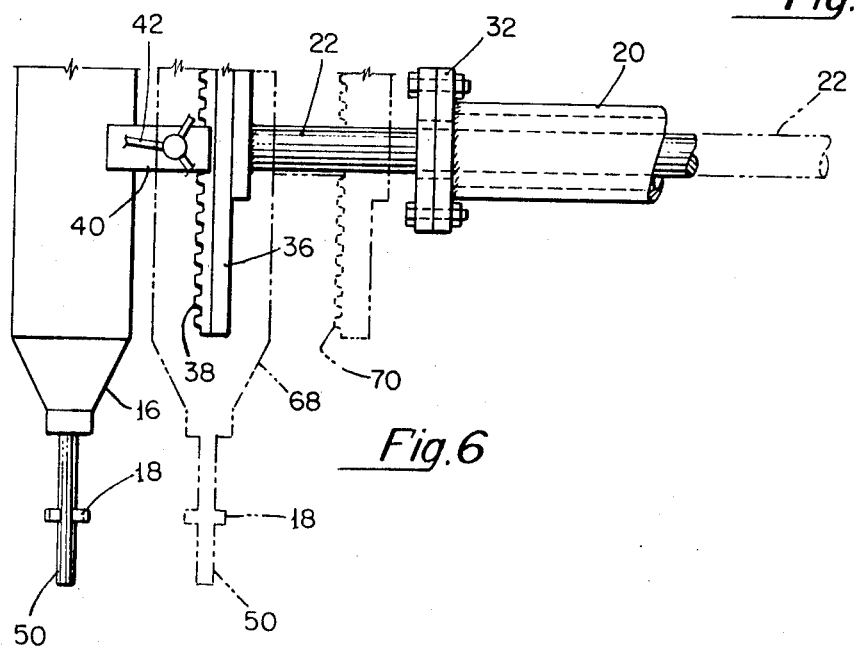
FIG. 6 is a side view of a portion of the apparatus of FIG. 1 illustrating various operating positions, in accordance with the present invention.

FIG. 2 also illustrates the rotational movement of the tool 16, with the dotted lines 64 illustrating a position of the tool after it has been moved a number of holes from a starting position, which is illustrated by the solid lines. FIG. 3 also illustrates the radial movement of the tool 16, with the dotted lines illustrating the position of the tool 16 when it is extended into a hole in the drum. FIG. 6 illustrates the tool 16 at different longitudinal positions with dotted lines 68 and 70 representing the tool in different positions from its original position illustrated by the solid lines.

After all the holes in the drum have been drilled or bored to the proper size, the tubes may be inserted therein. An expander machine (not illustrated) is used to expand the ends of the tubes to provide a tight mechanical seal against the edges of the holes in a well known manner.

Figure 8A:
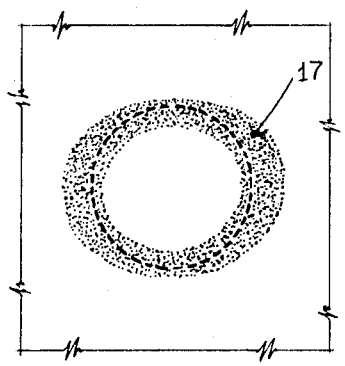
FIGS. 8a, 8b and 8c illustrate steps in the repair of a drum which involves the addition of metal rings.
Figure 8B:
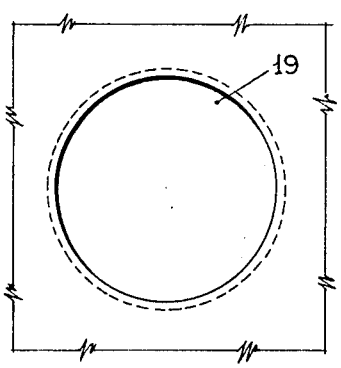
Figure 8C:
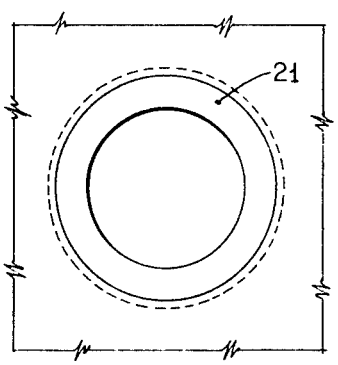

FIGS. 8a, 8b and 8c illustrate another embodiment of the method of the present invention. As is illustrated in FIG. 8a, in this embodiment, a hole 17 in a drum is bored to a larger size hole 19, illustrated in FIG. 8b. A tapered metal ring 21, with sufficient interference to facilitate a tap fit having substantially the same outside diameter as the hole 19, is then inserted into the hole 19. The ring 21 may be tapped into the hole 19 to fit tightly. This prevents the ring from spinning when it is expanded. The tapers of the hole 19 and ring 21 extend inwardly from the interior of the drum, with the narrow portions being towards the exterior of the drum. Thus, pressure within the drum tends to produce a better sealing effect between the ring and the drum. After insertion, the inner end of the ring 21 is then expanded in a well known manner to provide a good mechanical seal between the ring and the drum. The tapers of the ring and opening may be in the order of 3° to 5°, for example. The inner diameter of the ring 21 is dimensioned to receive the ends of the replacement tubes, with the ends of the tubes being expanded to provide good sealing between the tubes and the rings. This method is adaptable in cases were exotic metals are involved and welding is prohibited.

Figure 9:
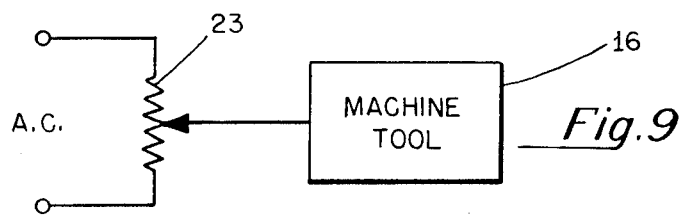
FIG. 9 is a schematic diagram illustrating circuitry for varying the speed of a machine tool.

In using the machine tool 16, it is desirable to use a variable speed for different drilling or boring operations where different size holes or other variable operating conditions are present. FIG. 9 illustrates an electrical circuit wherein a potentiometer or rheostat 23 is connected across the source of power to control the voltage applied to the tool 16, thereby controlling the speed thereof. For example, many commercially boring machines are adapted to operate at 250 rpm. Drilling of relatively large holes requires operation in the order of 100 rpm. The feature of variable speed adds to the versatility of the apparatus described.

A number of additions or changes may be made without departing from the scope of the present invention. For example, hydraulic means may be employed to perform some of the operations which, in the apparatus illustrated, are manually performed by an operator. The tube 20 includes piston elements connected to the shaft 22, which is adapted to provide the longitudinal movement of the tool 16 described. The centering or alignment means 28 and 30 may also be hydraulically driven to maintain the tool 16 properly centered. Gauge markings could be associated with the alignment means, if desired. Various rack and pinion assemblies including rams could be provided to provide measured movement of the tool 16 both rotationally and longitudinally. In advanced systems, the various steps of the tool 16 may be programmed to produce the desired operation and subsequent movements.

While the subject invention has been described in terms of repairing a drum, the apparatus and methods may also be used in the production of holes in a drum during manufacturing. The disposition of the apparatus within a drum facilitates the alignment of machining operations involved for both repair and manufacturing.

In some cases, operations in addition to boring and drilling may be desired, for example, threading or other machining operations may also be performed in the holes of a drum by use of the apparatus of the present invention.

The holes machined in the drum need not be disposed in precise alignment as illustrated, although this is generally the case in conventional boiler drums. Sometimes the movement of the tool 16 need only be in one direction, i.e. either rotated or moved longitudinally, to perform the desired operation.

The present invention has provided methods and means for repairing boiler drums which heretofore had to be replaced as a result of elongated holes formed by overheating. This results in considerable savings in the operation of steam generating plants both in the replacement equipment and the labor involved in installation of new equipment.

What is claimed is:

1. A method of repairing a cylindrical drum including a plurality of holes therein extending along a line longitudinally along said drum, said holes having become enlarged or elongated as a result of corrosion, overheating or the like, said method comprising the steps of adding a weld material to said drum in the area of said holes to reduce substantially the size of said holes and thus provide smaller holes, providing an assembly including a movably mounted tool with a cutter element larger in dimension than said smaller holes with said tool being movable longitudinally on said assembly, fixedly mounting said assembly inside of said drum in a predetermined position, moving said tool sequentially in steps with said assembly in place longitudinally within said drum to positions in alignment with said smaller holes, and machining away part of said weld material to produce a set of longitudinal holes corresponding to the dimensions of said cutter element.

2. A method as set forth in claim 1, wherein said plurality of holes in said drum also extend about the circumference of said drum and including the additional steps of rotatably mounting said tool in said shaft, rotating said tool within said drum with said assembly in place in alignment with said smaller holes extending about the circumference of said drum, and machining away part of said weld material about the circumference of said drum to produce holes corresponding to the dimensions of said cutter element.

3. A method as set forth in claim 2, wherein the additional steps are provided of adjusting the rotational axis of said tool to substantial alignment with the longitudinal axis of said drum.

4. A method as set forth in claim 3, wherein the additional steps are provided of sequentially drilling an additional set of circumferentially spaced holes after moving said tool a predetermined distance after the drilling of each individual set of holes.

5. A method of repairing a plurality of irregularly shaped damaged holes in a drum comprising the steps of adding a weld material to said drum in the area of said holes to reduce substantially the size of said holes and thus provide smaller holes, inserting apparatus including a movably mounted machine tool with a cutting element inside of said drum, machining said smaller holes to a circular shape with said apparatus in place, inserting metal rings into said circular shaped holes, expanding said rings to provide tight mechanical seals with said drum, inserting tubes into said rings, and expanding the ends of said tubes to provide tight mechanical seals with the interior surfaces of said rings.

6. A method of repairing a cylindrical drum having a plurality of enlarged or elongated holes extending around the circumference of said drum, said method comprising the steps of adding a weld material to said drum in the area of said holes to reduce substantially the size of said holes and thus provide smaller holes, providing an assembly including a tool with a cutter element larger in dimensions than said smaller holes with said tool being rotatable on said assembly, fixedly mounting said assembly within said drum in a predetermined position, rotating said tool sequentially in steps with said assembly in place within said drum to positions in alignment with said smaller holes, and machining away part of said weld material to produce a set of circular holes around the circumference of said drum corresponding to the dimensions of said cutter element.

7. A method as set forth in claim 5 wherein the step of machining comprises machining the circular holes to have tapered edges and further including the step of inserting into said circular holes metal rings having tapered edges corresponding to the tapers of said circular holes.

* * * * *